US006758036B1

(12) United States Patent
Molinier

(10) Patent No.: US 6,758,036 B1
(45) Date of Patent: Jul. 6, 2004

(54) METHOD FOR SULFUR PROTECTION OF $NO_X$ ADSORBER

(75) Inventor: Michel Molinier, Broken Arrow, OK (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/699,053

(22) Filed: Oct. 27, 2000

(51) Int. Cl.[7] .................... F01N 3/00

(52) U.S. Cl. .................... 60/286; 60/295; 60/301; 60/311

(58) Field of Search .................... 60/286, 295, 297, 60/301, 311

(56) References Cited

U.S. PATENT DOCUMENTS

| | | | | |
|---|---|---|---|---|
| 2,898,202 A | | 8/1959 | Houdry et al. | 23/288 |
| 3,370,914 A | | 2/1968 | Gross et al. | 23/2 |
| 4,576,617 A | | 3/1986 | Renevot | 55/96 |
| 5,272,871 A | | 12/1993 | Oshima et al. | 60/274 |
| 5,322,671 A | | 6/1994 | Shustorovich et al. | 422/176 |
| 5,406,790 A | | 4/1995 | Hirota et al. | 60/276 |
| 5,412,946 A | | 5/1995 | Oshima et al. | 60/286 |
| 5,437,153 A | | 8/1995 | Takeshima et al. | 60/276 |
| 5,472,673 A | * | 12/1995 | Goto et al. | 60/297 |
| 5,473,890 A | * | 12/1995 | Takeshima et al. | 60/286 |
| 5,543,124 A | | 8/1996 | Yokota et al. | 423/239.1 |
| 5,551,231 A | | 9/1996 | Tanaka et al. | 60/289 |
| 5,586,433 A | | 12/1996 | Boegner et al. | 60/274 |
| 5,606,856 A | | 3/1997 | Linder et al. | 60/286 |
| 5,657,625 A | * | 8/1997 | Koga et al. | 60/297 |
| 5,711,149 A | * | 1/1998 | Araki | 60/286 |
| 5,727,385 A | | 3/1998 | Hepburn | 60/297 |
| 5,746,989 A | | 5/1998 | Murachi et al. | 423/212 R |
| 5,768,888 A | | 6/1998 | Matros et al. | 60/274 |
| 5,850,735 A | * | 12/1998 | Araki et al. | 60/286 |
| 5,894,725 A | | 4/1999 | Cullen et al. | 60/274 |
| 5,921,076 A | * | 7/1999 | Krutzsch et al. | 60/286 |
| 6,122,909 A | | 9/2000 | Murphy et al. | 60/286 |
| 6,125,629 A | * | 10/2000 | Patchett | 60/286 |
| 6,170,259 B1 | | 1/2001 | Boegner et al. | 60/286 |
| 6,176,078 B1 | | 1/2001 | Balko et al. | 60/274 |
| 6,199,374 B1 | * | 3/2001 | Hirota et al. | 60/277 |
| 6,199,375 B1 | * | 3/2001 | Russell | 60/286 |
| 6,237,326 B1 | * | 5/2001 | Russell | 60/297 |
| 6,247,303 B1 | | 6/2001 | Broer et al. | 60/274 |
| 6,253,543 B1 | * | 7/2001 | Russell | 60/286 |
| 6,260,353 B1 | | 7/2001 | Takahashi | 60/286 |
| 6,269,633 B1 | * | 8/2001 | Van Nieuwstadt et al. | 60/286 |
| 6,272,848 B1 | * | 8/2001 | Okude et al. | 60/295 |
| 6,293,094 B1 | * | 9/2001 | Schmidt et al. | 60/284 |
| 6,293,096 B1 | | 9/2001 | Khair et al. | 60/286 |
| 6,301,882 B1 | * | 10/2001 | Manaka | 60/301 |
| 6,318,075 B1 | * | 11/2001 | Gunther et al. | 60/285 |
| 6,324,834 B1 | | 12/2001 | Schnaibel et al. | 60/274 |
| 6,354,078 B1 | | 3/2002 | Karlsson et al. | 60/274 |
| 6,502,391 B1 | * | 1/2003 | Hirota et al. | 60/295 |
| 6,560,958 B1 | | 5/2003 | Bromberg et al. | 60/275 |
| 2001/0004832 A1 | | 6/2001 | Hanaki et al. | 60/286 |
| 2001/0039798 A1 | | 11/2001 | Pott | 60/278 |
| 2001/0041153 A1 | | 11/2001 | Benz | 422/169 |
| 2003/0101713 A1 | | 6/2003 | Betta et al. | 60/284 |

FOREIGN PATENT DOCUMENTS

| | | | |
|---|---|---|---|
| DE | 19543219 C1 | | 12/1996 |
| JP | 06-336914 | * | 12/1994 |
| WO | WO 01/14698 A1 | | 3/2001 |

OTHER PUBLICATIONS

Japanese Patent No.: JP406117224A; Publication Date: Apr. 26, 1994; Abstract Only (1 page).

* cited by examiner

*Primary Examiner*—Thomas Denion
*Assistant Examiner*—Diem Tran
(74) *Attorney, Agent, or Firm*—Jimmy L. Funke

(57) ABSTRACT

A $NO_x$ adsorber is protected from sulfur poisoning by introducing fuel to the $NO_x$ adsorber prior to a sulfur trap and/or particulate trap regeneration stream entering the $NO_x$ adsorber. The fuel establishes a rich environment, thereby inhibiting sulfur adsorption in the $NO_x$ adsorber.

8 Claims, 5 Drawing Sheets

4
2 A
2 B
7
ENGINE
3
8
5
6
1
9

METHOD FOR SULFUR PROTECTION OF $NO_x$ ADSORBER

TECHNICAL FIELD

The present invention relates to a method for sulfur protection of a $NO_x$ adsorber, and especially relates to the use of fuel to protect a $NO_x$ adsorber against sulfur poisoning.

BACKGROUND OF THE INVENTION

It is well known in the art to use catalyst compositions, including those commonly referred to as three-way conversion catalysts ("TWC catalysts") to treat the exhaust gases of internal combustion engines. Such catalysts, containing precious metals like platinum, palladium, and rhodium, have been found both to successfully promote the oxidation of unburned hydrocarbons (HC) and carbon monoxide (CO) and to promote the reduction of nitrogen oxides ($NO_x$) in exhaust gas, provided that the engine is operated around balanced stoichiometry for combustion ("combustion stoichiometry"; i.e. between about 14.7 and 14.4 air/fuel (A/F) ratio).

Fuel economy and global carbon dioxide ($CO_2$) emissions have made it desirable to operate the engine under lean-burn conditions, where the air-to-fuel ratio is somewhat greater than combustion stoichiometry (i.e., greater than 14.7 and generally between 19 and 35), to realize a benefit in fuel economy. When lean-burn conditions are employed, three way catalysts are efficient in oxidizing the unburned hydrocarbons and carbon monoxides, but are inefficient in the reduction of nitrogen oxides.

One approach for treating nitrogen oxides in exhaust gases of engines operating under lean-burn conditions has been to incorporate $NO_x$ adsorbers in exhaust lines along with three way catalysts. Conventional exhaust systems contemplate various configurations, including for example, use of $NO_x$ adsorbers in the same canister along with three-way catalysts or use of a $NO_x$ adsorber in a separate can upstream of the three-way catalyst, among others.

These adsorbers generally comprise one or more catalytic metal(s), such as platinum, palladium and/or rhodium, in combination with an alkali and/or alkaline earth element, loaded on a porous support such as alumina, gamma-alumina, zirconia, titania, alpha-alumina, cerium oxide (ceria), lanthanum oxide, or magnesium oxide. The catalytic material in the adsorber acts first to oxidize NO to $NO_2$. $NO_2$ then reacts with the alkali and alkaline earth element to form stable nitrate salts. In a stoichiometric or rich environment, the nitrate is thermodynamically unstable. Consequently, the stored $NO_x$ is released for catalysis, whereupon $NO_x$ is reduced to $N_2$ gas.

For practical incorporation of the supported catalytic materials into internal combustion engine exhaust systems, the support will, itself, be deposited on a chemically stable and thermally insulating substrate. Particularly useful substrates include cordierite and mullite, among others. The substrate may be of any size or shape, such as is required by the physical dimensions of the designed exhaust system. Similarly, the internal configuration of the substrate may be any known or commonly employed configuration. Substrates are typically formed as monolithic honeycomb structures, layered materials, or spun fibers, among other configurations.

U.S. Pat. No. 5,727,385 to Hepburn, which is herein incorporated by reference, discloses a $NO_x$ trap, comprising (i) at least one precious metal selected from platinum and palladium loaded on a porous support; and (ii) at least one alkali or alkaline earth metal (a) loaded on a porous support or (b) present as an oxide thereof. Hepburn optionally includes a three-way catalyst located either between the two components or after the $NO_x$ trap.

Although the $NO_x$ adsorbers remove the $NO_x$ from the exhaust stream during lean burn conditions and/or low temperatures, they are plagued with the problem of sulfur poisoning under such conditions. Sulfur, a contaminant present in fuel, adsorbs onto the $NO_x$ adsorber, reducing the sites available for trapping $NO_x$.

What is needed in the art is an exhaust gas catalyst system having improved durability, as well as $NO_x$ and sulfur management, over extended operating time.

SUMMARY OF THE INVENTION

The above-described and other disadvantages of the prior art are overcome by the exhaust gas systems of the present invention and the methods for regenerating a particulate trap and for regenerating a sulfur trap. One embodiment of the system comprises a sulfur trap disposed within an exhaust stream, the sulfur trap comprising a sulfur scavenger component, a $NO_x$ adsorber disposed within the exhaust stream, downstream from the sulfur trap, and a fuel introduction point located between the $NO_x$ adsorber and the sulfur trap.

Another embodiment of the system comprises a particulate trap disposed within an exhaust stream, a $NO_x$ adsorber disposed within the exhaust stream, downstream from the particulate trap, and a fuel introduction point located between the $NO_x$ adsorber and the particulate trap.

The method for regenerating a sulfur trap in an exhaust system having the sulfur trap disposed upstream of a $NO_x$ adsorber, comprises introducing at least a portion of a fuel rich exhaust stream to the sulfur trap and removing sulfur species from the sulfur trap. Then, before the exhaust stream is directed from the sulfur trap through the $NO_x$ adsorber, fuel is introduced to the $NO_x$ adsorber.

The method for regenerating a particulate trap in an exhaust system having a particulate trap disposed upstream of a $NO_x$ adsorber, comprises introducing at least a portion of the exhaust stream to the particulate trap and regenerating the particulate trap to produce a hot exhaust stream. Then, prior to directing the hot exhaust stream through the $NO_x$ adsorber, fuel is introduced to the $NO_x$ adsorber.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings, which are meant to be exemplary, not limiting, and wherein like elements are numbered alike in the several Figures, in which.

DESCRIPTION OF THE PREFERRED EMBODIMENT

Figure 1:
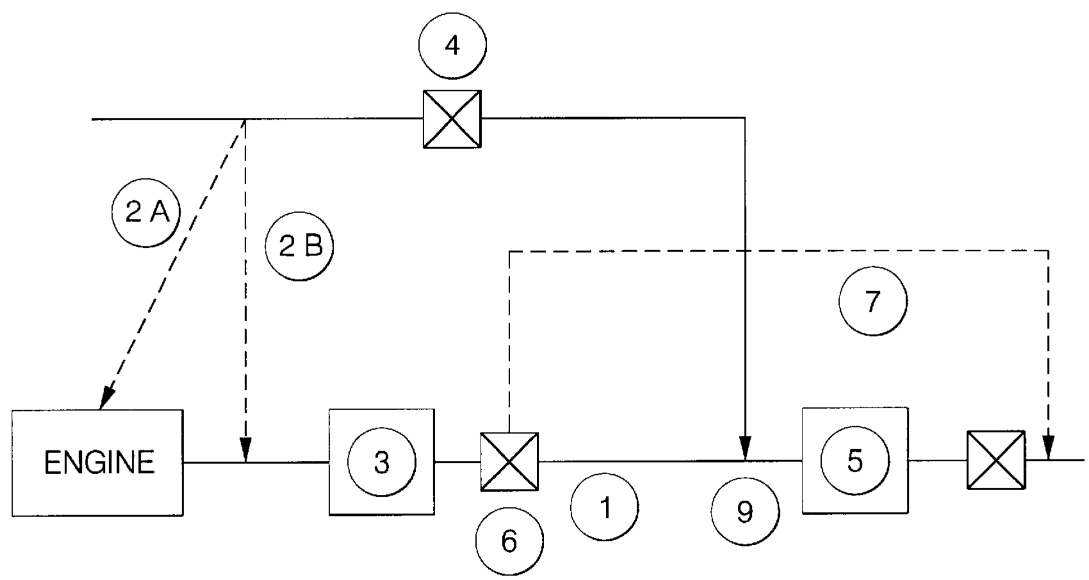
FIG. 1 diagrammatically illustrates one embodiment of an exhaust gas catalyst system, comprising a warm-up catalyst with a sulfur trap function, located in close coupled position with an internal combustion engine, and a $NO_x$ adsorber catalyst, placed in underfloor position.

The exhaust gas catalyst system provides management of $NO_x$ and sulfur components and/or particulate matter through incorporation of a sulfur trap and/or a particulate trap upstream from a $NO_x$ adsorber, with a fuel injection point disposed between the sulfur trap and the $NO_x$ adsorber. Essentially, this system allows for the injection of fuel in front of the $NO_x$ adsorber, downstream of the sulfur trap and/or particulate trap, in order to maintain a fuel rich condition and inhibit sulfur poisoning of the $NO_x$ adsorber and also enables use of the exotherm created by the regeneration of the particulate trap to desulfurize the $NO_x$ adsorber.

As with the $NO_x$ adsorber and particulate trap, the sulfur trap can be conventional. For example, the sulfur trap can comprise a sulfur scavenging component and optionally a catalytic component(s) (lean $NO_x$ catalyst and/or $NO_x$ trap catalyst and/or oxidation catalyst) comprising one or more precious metals, e.g., an oxidation catalyst and/or a $NO_x$ catalyst, disposed on a substrate. Some possible precious metals, include palladium, platinum, rhodium, osmium, iridium, ruthenium, and/or an alloy or mixture comprising at least one of these precious metals.

Parameters in selecting sulfur scavenging components for the sulfur trap include the temperatures at which these components release sulfur species and the level of exhaust richness required to trigger such release. These parameters may be adjusted to the particular exhaust design, and materials selected, accordingly. The sulfur scavenging component comprises trapping element(s) having a sufficient affinity for sulfur to enable adsorption in a lean exhaust environment (e.g., at an air fuel ratio of about 16 or higher) and optionally, a support. Trapping elements including Ag, Al, Ba, Ce, Co, Cu, La, Li, Mg, Na, Nd, Rb, Sn, Sr, and Zn, among others, and combinations comprising at least one of the foregoing, have been found to be optimally effective and are accordingly preferred. Combinations of two or more elements are particularly preferred since such combination provides a more balanced adsorption performance:over wider air-fuel ratio and temperature ranges.

The trapping element(s) may be applied to the support as is known in the art. Desirably, the support material has a fresh surface area above about 300 square meters per gram ($m^2/g$). Suitable supports include materials such as alumina (gamma-alumina, alpha alumina, theta alumina, and the like), zeolite, zirconia, magnesium oxide, titania, silica, ceria, and combinations comprising at least one of the foregoing, among others.

To provide structural integrity to the sulfur trap, the support is, itself, preferably carried on a high temperature, insulating substrate. Particularly useful substrates, which are stable in high temperatures, include cordierite, refractory oxide, silicon carbide, mullite, and metal substrates, among others. This substrate, which may be in any known or commonly employed configuration, is typically formed as a monolithic honeycomb structure, layered materials, or spun fibers, among other configurations.

The sulfur trap can be disposed at any location in the exhaust system, upstream of the $NO_x$ adsorber. In a preferred embodiment, regardless of the type of exhaust system (including diesel), the sulfur trap is employed in a close coupled position, upstream of a $NO_x$ adsorber. Because the sulfur trap is proximal to the engine, $NO_x$ conversion over the sulfur trap catalyst occurs before the temperature is sufficient to fully adsorb $NO_x$ species. As a result, overall system performance is enhanced. Further, NO to $NO_2$ oxidation over the sulfur trap also improves $NO_x$ trapping efficiency on the downstream $NO_x$ adsorber.

The $NO_x$ adsorber used in conjunction with the sulfur trap may be any $NO_x$ adsorber as can be found in the prior art. The $NO_x$ adsorber should comprise a catalyst capable of catalyzing $NO_x$ under rich conditions and a material capable of adsorbing $NO_x$ under lean conditions. Typically, the $NO_x$ adsorber comprises a catalyst, such as a precious metal, metal oxide, alkali and/or alkaline earth metal, disposed on a support such as alumina, titania, zeolite, zirconia, ceria, lanthanum oxide, or a combination comprising at least one of the foregoing. An exemplary $NO_x$ adsorber is described in U.S. Pat. No. 5,727,385 to Hepburn, which discloses a $NO_x$ adsorber, comprising: (i) at least one precious metal selected from platinum and palladium loaded on a porous support; and (ii) at least one alkali or alkaline earth metal (a) loaded on a porous support or (b) present as an oxide thereof.

With reference to FIG. 1, for example, the exhaust gas system comprises a sulfur trap (3), located within the exhaust stream and a $NO_x$ adsorber (5) downstream of the sulfur trap (3), in an underfloor position. As discussed above, depending on the application, the sulfur trap (3) can optionally be solely a sulfur scavenger component, the combination of an oxidation catalyst and a sulfur scavenging component, the admixture of a lean $NO_x$ catalyst and sulfur scavenging component, the admixture of a $NO_x$ trap component and sulfur scavenging component, or the admixture of all the above described functions.

During operation of the exhaust gas system, the sulfur scavenging component requires periodic regenerations that are achieved by phases combining richness (i.e., a fuel rich stream) and temperature compatible with sulfur desorption prerequisites. Depending upon the type of system (internal combustion engine, diesel . . . ), the type of regeneration, e.g., continuous or periodic, and the specific times and temperatures of the regeneration, are chosen accordingly.

During a rich excursion aimed to purge the sulfur trap, sulfur is released from the sulfur trap predominantly in the form of $H_2S$ or $SO_2$, depending on various factors such as particular design preference, release temperature, air to fuel ratio, and materials used to build the sulfur trap. Unless a bypass system combining valve (6) and pipe (7) is used to avoid the $NO_x$ trap, the "sulfur wave" created by the hot rich excursion propagates through the exhaust line (1) and across the $NO_x$ adsorber catalyst (5). Because of the $NO_x$ adsorber oxygen storage capacity, some of the reducing species primarily CO and hydrocarbons accompanying the rich sulfur wave will be quickly consumed as the rich pulse hits the $NO_x$ adsorber. As a result, the $NO_x$ adsorber may, for an instant, switch the localized environment back to lean and thus create an opportunity for sulfur poisoning of the $NO_x$ adsorber; even if the time frame for poisoning is very short, the damage could be severe since sulfur content in the traveling wave is very high.

Figure 2:
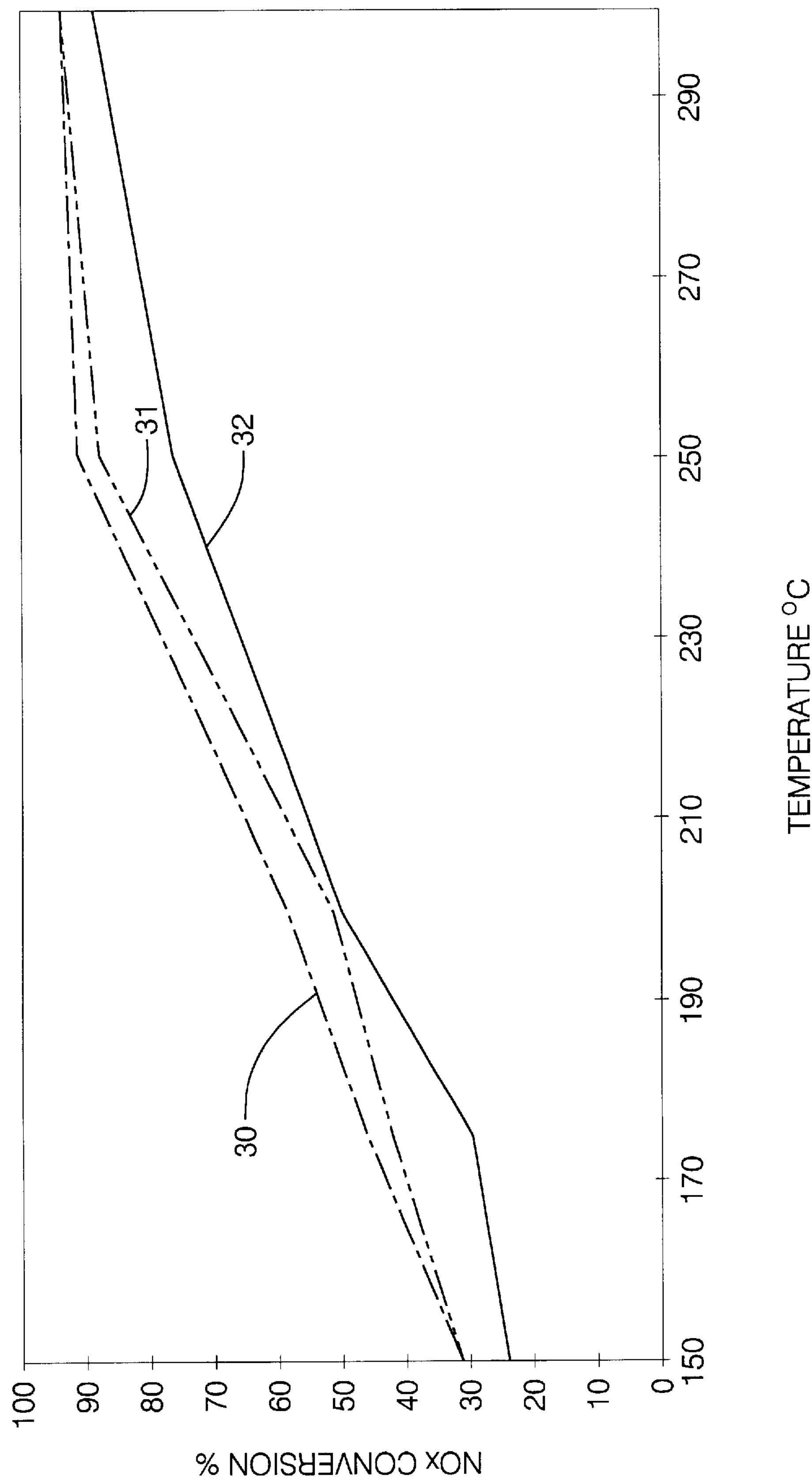
FIG. 2 is a graphical illustration of $NO_x$ adsorber conversion efficiency after aging at 300° C. for 20 hours in the presence of $H_2S$ or $SO_2$ in a rich environment (air/fuel ratio is 13.2).

It has been experimentally demonstrated that sulfur, for example $H_2S$ or $SO_2$, is far more detrimental to a $NO_x$ adsorber in a lean environment than in a rich environment. As is shown in FIG. 2, very low degradation of the $NO_x$ adsorber conversion efficiency is experienced after long aging in the presence of $H_2S$ (line 31) or $SO_2$ (line 32) (as compared to no sulfur (line 30)), under rich conditions (air/fuel of about 13.2 or less).

Figure 3:
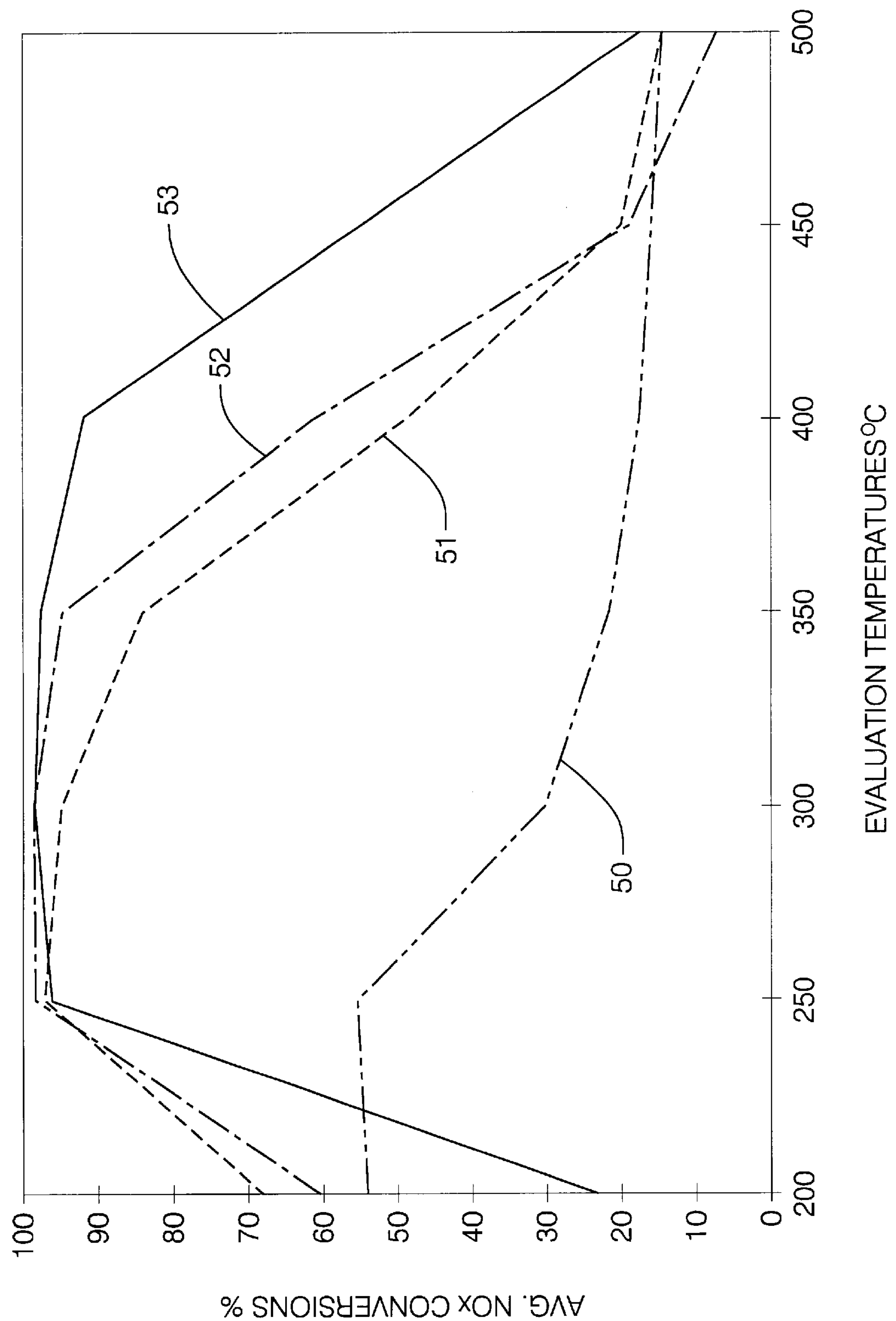
FIG. 3 is a graphical representation of $NO_x$ adsorber conversion efficiency following modulation with different $SO_2$ concentrations for 30 hours at 400° C. (air/fuel ratio is 21 lean, 12 rich).

In contrast, referring to FIG. 3, under lean conditions (A/F of 21), a drastic change in conversion efficiency is observed with even a small amount of sulfur. In this figure, as well as FIG. 4, the adsorbers have been modulation aged, i.e., aging with varying amounts of sulfur (0, 2, 5, 10 parts per million (ppm) $SO_2$) while alternating between rich (A/F=12) and lean (A/F=21) at 400° C. for 30 hours. As can be seen from FIG. 3, after the aging, when introducing a stream comprising 10 ppm sulfur, the adsorbers aged with small amounts of sulfur, line 53 (no sulfur), line 52 (2 parts per million (ppm)), line 51 (5 ppm sulfur), possessed good $NO_x$ adsorption capacity (e.g., greater than about 90%, and preferably greater than about 95%) at particular temperatures. In contrast, as is shown by line 50 (10 ppm sulfur), the adsorber which was aged with a high amount of sulfur (10 ppm $SO_2$) was substantially ineffective in $NO_x$ conversion; i.e., less than about 55%, with less than about 30% conversion at 300° C.

Figure 4:
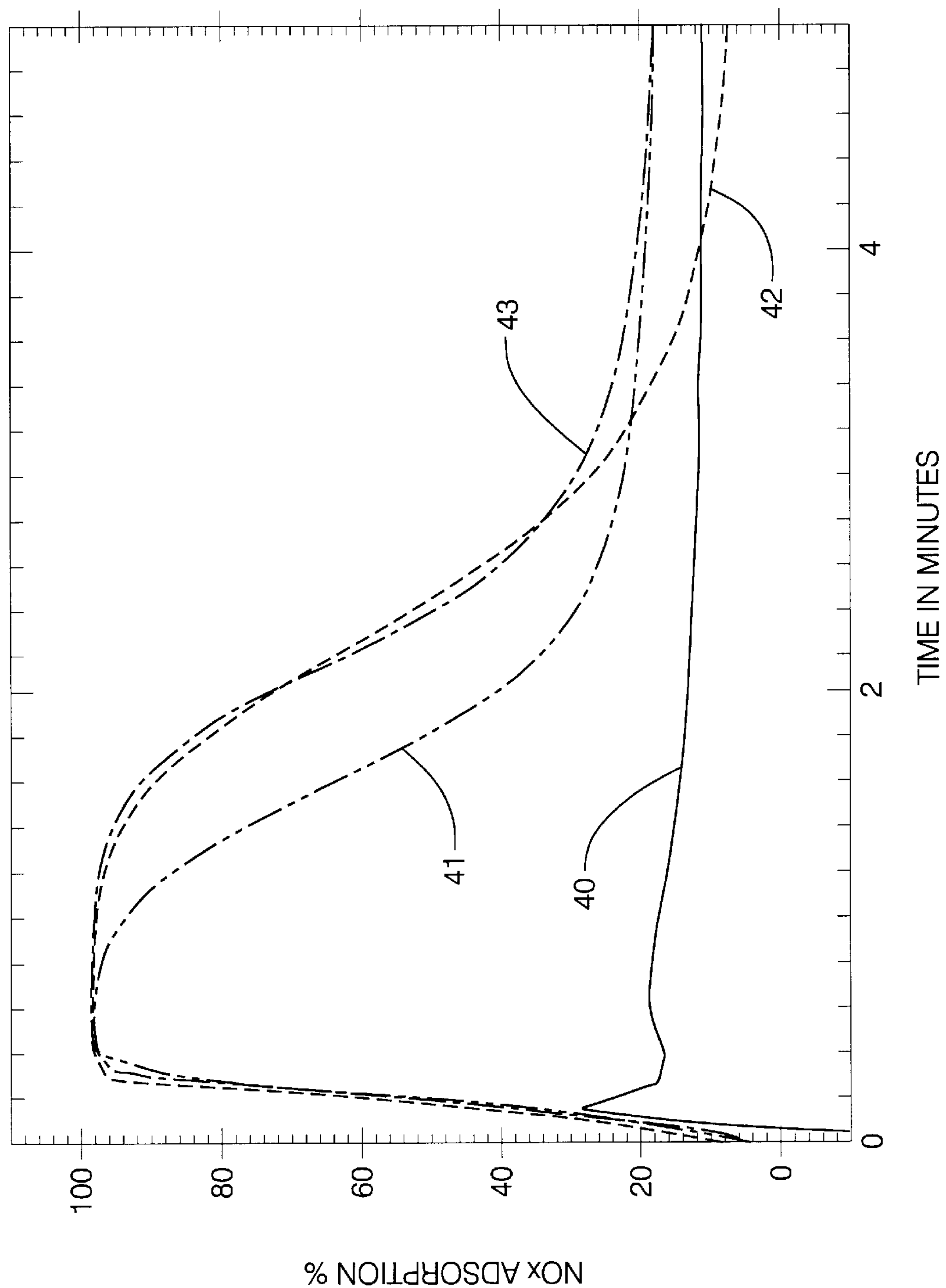
FIG. 4 is a graphical illustration of $NO_x$ adsorber adsorption efficiency at 300° C. following modulation aging with $SO_2$ for 30 hours at 400° C. (air/fuel ratio is 21 lean, 12 rich).

Referring to FIG. 4, $NO_x$ adsorber adsorption efficiency at 300° C. is shown following modulation aging at 400° C. for 30 hours at different sulfur (namely, $SO_2$) concentrations. As can be seen, following aging in the presence of 10 ppm $SO_2$, the $NO_x$ adsorption efficiency reduces from about 98% efficient to about 20% efficient. Essentially, after the 30 hours aging, adsorbers aged with low sulfur concentrations, i.e., no $SO_2$ (line 42), 2 ppm $SO_2$ (line 43), and 5 ppm $SO_2$ (line 41), possessed good adsorption capacities, e.g., greater than about 95%, and more accurately about 98%. On the other hand, the adsorber aged with 10 ppm $SO_2$ (line 40) possessed poor adsorption after the aging process, namely about 30%, with decreased to below about 20% within about 30 seconds. This supports the premise that the adsorber is quickly poisoned by relatively small amounts of sulfur (about 10 ppm), and even for adsorbers aged with small amounts of sulfur, i.e., about 5 ppm sulfur, the adsorption capacity is reduced.

Considering the effect of sulfur on the adsorber under lean conditions, and the fact that even small amounts of sulfur poison the adsorber, at the beginning of a rich pulse aimed to purge the sulfur trap, a sufficient amount of injected fuel may be sprayed directly in front of the $NO_x$ adsorber catalyst, in order to consume substantially all (e.g., greater than about 90%, with greater than 95% preferred, and greater than 99% especially preferred), oxygen and $NO_x$ stored in the $NO_x$ adsorber prior to contact with sulfur species. The injected fuel passes through valve (4), which can optionally be electrically controlled, and is sprayed directly in front of the $NO_x$ adsorber (5).

Figure 5:
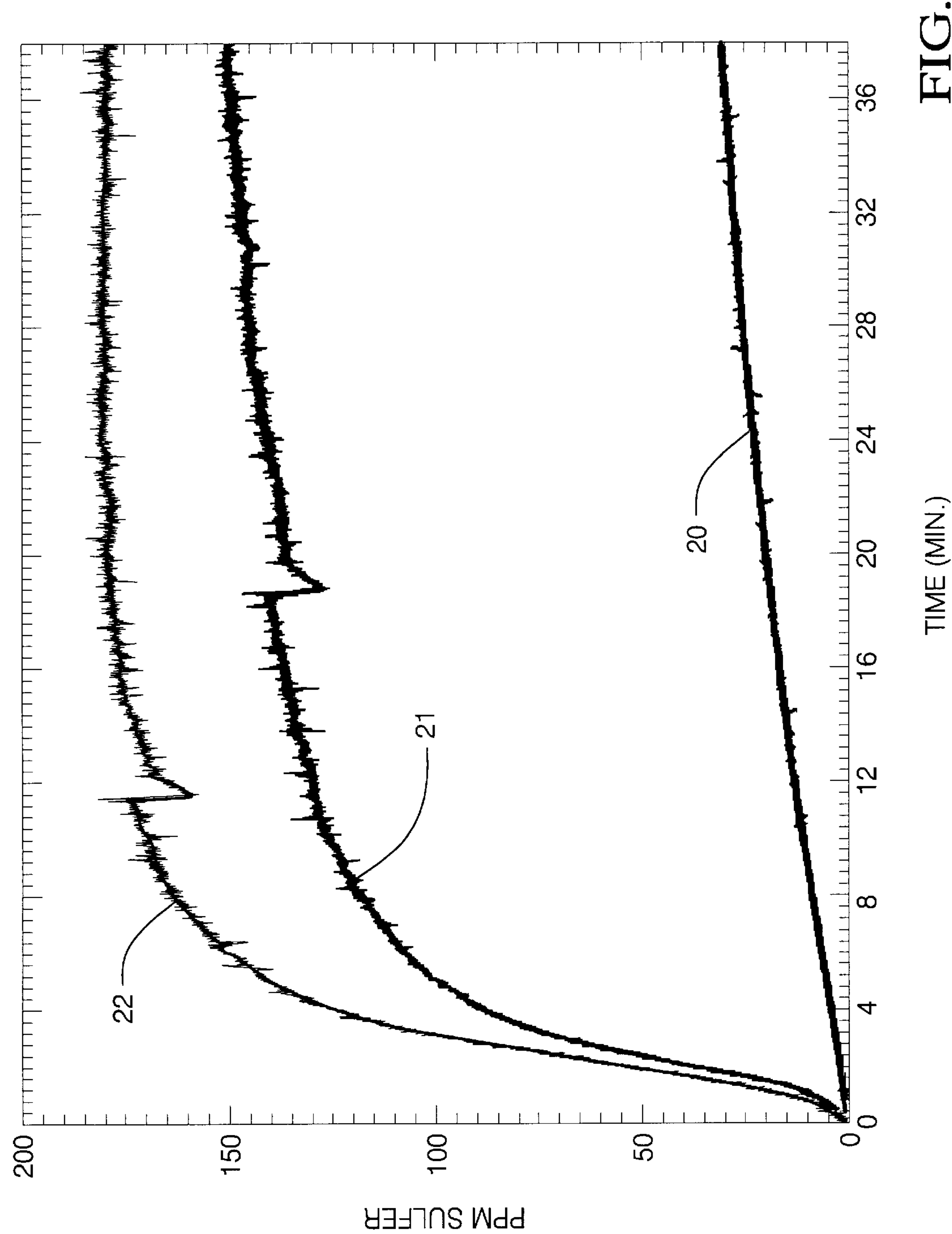
FIG. 5 is a graphical illustration of the rich and lean adsorption of sulfur at 400° C. for 40 minutes by a $NO_x$ adsorber.

Referring to FIG. 5, a $NO_x$ adsorber is tested for sulfur adsorption; 150 ppm inlet sulfur compound, i.e., hydrogen sulfide ($H_2S$) or sulfur dioxide ($SO_2$), under rich conditions (A/F=13) versus lean conditions (A/F=20), over time, at 400° C. The concentrations plotted equate the amount of sulfur compound in the effluent stream exiting the adsorber. As is evident from the graph, under rich conditions, sulfur adsorption is low (for $H_2S$, substantially all of the sulfur exited the adsorber (line 22), and for $SO_2$, greater than about 130 ppm of the sulfur exited the adsorber (line 21)). In contrast, under lean conditions, sulfur adsorption by the $NO_x$ adsorber was high (for $SO_2$, less than about 30 ppm of the sulfur exited the adsorber (line 20)).

In a further development, the concept may be applied to a more complex system, for protection of a $NO_x$ adsorber from sulfur poisoning and for periodic expelling of sulfur from a poisoned $NO_x$ adsorber. In spite of all efforts to prevent sulfur from being captured on $NO_x$ adsorbing sites, $NO_x$ adsorber desulfurization will be necessary after a period of time unless a bypass system combining valve (6) and pipe (7) is provided.

Figure 6:
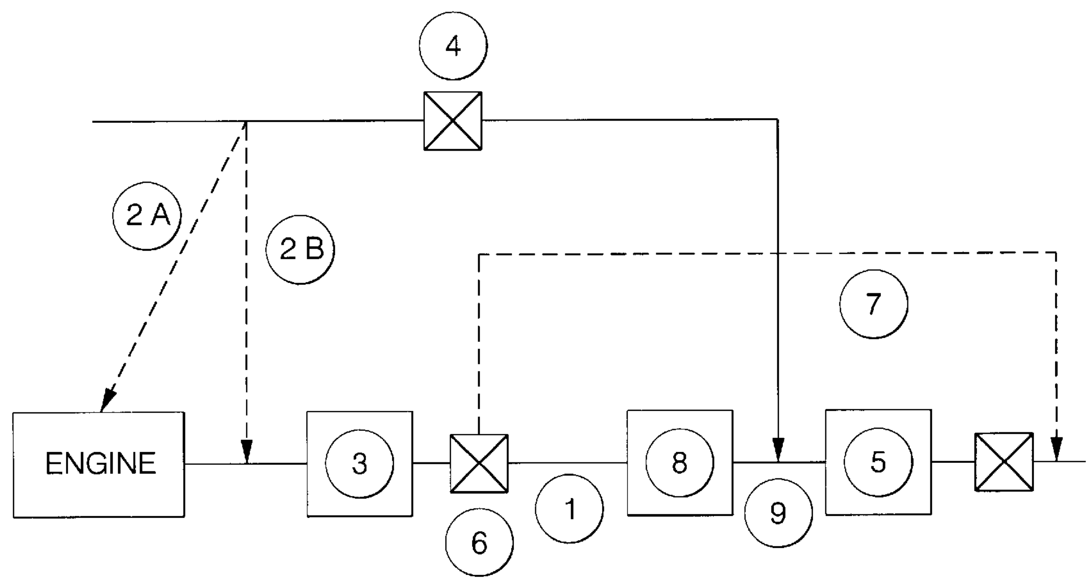
FIG. 6 diagrammatically illustrates another embodiment of an exhaust gas catalyst system in a diesel engine, further comprising a particulate trap.

With reference to FIG. 6, a catalytic converter system comprises a sulfur trap (3), a particulate trap (8) and a $NO_x$ adsorber (5), with the components designed and materials selected according to particular engine type, including gasoline and diesel engines, among others. A preferred diesel designed converter system comprises an optional sulfur trap (3) located in a close coupled position with the diesel engine, a $NO_x$ adsorber (5), and a particulate trap (8), preferably housed in an underfloor position, disposed therebetween, with a fuel injection point (9) preferably disposed between the particulate trap (8) and the $NO_x$ adsorber (5).

During operation, $NO_x$ adsorber protection from sulfur is important because removal of sulfur from a poisoned $NO_x$ adsorber requires, in addition to a rich environment, temperatures of about 600 to about 700° C., which are difficult to achieve, particularly in a diesel exhaust, and even more difficult to obtain in an underfloor position. However, when it becomes necessary to regenerate the particulate trap, the particulate trap (8) goes through a regeneration phase, producing high exotherms as the result of the catalytic combustion of soot captured in the filter. During regeneration of a particulate trap, temperatures of about 800° C. may be created but conventionally could not be taken advantage of for $NO_x$ adsorber desulfurization since the air/fuel ratio was not favorable. Consequently, to enable the use of these temperatures, valve (4) can be opened to introduce a sufficient portion of injected fuel in front of the $NO_x$ adsorber to create the necessary rich environment. Thus, during the particulate trap purge, both high temperature and richness can be achieved simultaneously for desulfurization of the $NO_x$ adsorber catalyst.

As a result of the combined particulate trap regeneration temperature and the rich environment created by the injected fuel, in a system with a particulate trap (8), the sulfur trap (3) becomes optional. Prior to the efficiency of the $NO_x$ adsorber becoming adversely affected by the trapped sulfur, the sulfur can be removed from the $NO_x$ adsorber during the regeneration of the particulate trap (8).

The estimated time for regeneration generally averages about up to about 3 minutes or so, with about two to three minutes typical. Where this event occurs in less than about every 800 miles, preferably about every 300 to about 500 miles, the system can operate without a sulfur trap. However, inclusion of the sulfur trap provides sulfur protection to the $NO_x$ adsorber in addition to the occasional desulfurizations thereof coupled to the regenerations of the particulate trap. Essentially, without the sulfur trap, the $NO_x$ adsorber adsorbs sulfur in lean conditions. However, since the $NO_x$ adsorber is regenerated within about 800 miles, the sulfur does not poison the $NO_x$ adsorber to a point of inefficiency prior to desulfurization.

Advantageously, the present invention provides methods and hardware for the prevention of sulfur re-adsorption on downstream $NO_x$ adsorbers as part of a dynamic sulfur maintenance strategy. Re-adsorption is inhibited by pre-reduction of the $NO_x$ adsorber, i.e., before introduction of the sulfur trap regeneration stream. For diesel engines, the sulfur maintenance strategies further allow use of particulate trap regeneration exotherms for desulfurization without additional hardware, electronic control, or fuel economy penalty. Further the sulfur maintenance strategies allow sulfur trapping over an extended period of time with sulfur trap regenerations and without worrying about exhaust system deactivation issues. Also, for the $NO_x$ adsorber in an underfloor position, utilization of sulfur protection drastically extends $NO_x$ adsorber high-activity periods. Consequently, $NO_x$ adsorber desulfurization is far less often required, translating to better fuel economy. For example, if sulfur trap purge is achieved across the downstream $NO_x$ adsorber through a rich wave using the present invention, i.e. lean sulfur poisoning of the $NO_x$ adsorber is prevented, then referring to the results displayed in FIG. 5 (lean vs. rich sulfur poisoning), it can be predicted that the $NO_x$ adsorber sulfur poisoning will be decreased by at least an order of magnitude. Consequently, when employing the present invention, the high temperature desulfurization of the $NO_x$ adsorber will be required one tenth (or less) as frequently as a system which does not employ the rich wave through the $NO_x$ adsorber.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for regenerating a sulfur trap in an exhaust system having the sulfur trap disposed upstream of a $NO_x$ adsorber, comprising:

introducing at least a portion of a fuel rich exhaust stream to the sulfur trap;

removing sulfur species from the sulfur trap to form a sulfur exhaust stream;

passing the sulfur exhaust stream through a particulate trap, disposed upstream of the $NO_x$ adsorber;

introducing fuel to the $NO_x$ adsorber to form a fueled adsorber; and directing the sulfur exhaust stream through the fueled adsorber.

2. The method for regenerating a sulfur trap as in claim 1, further comprising regenerating the particulate trap.

3. The method for regenerating a sulfur trap as in claim 2, wherein introducing fuel to the $NO_x$ adsorber occurs during the regenerating of the particulate trap.

4. The method for regenerating a sulfur trap as in claim 1, wherein the sulfur trap is disposed in a close-coupled position relative to an internal combustion engine.

5. An exhaust gas system, comprising:

a sulfur trap disposed within an exhaust stream, the sulfur trap comprising a sulfur scavenger component;

a $NO_x$ adsorber disposed within the exhaust stream, downstream from the sulfur trap;

a fuel introduction point between the $NO_x$ adsorber and the sulfur trap; and a particulate trap disposed upstream of the fuel introduction point.

6. The exhaust gas system of claim 5, further comprising a three-way catalyst positioned downstream of the $NO_x$ adsorber or in the $NO_x$ adsorber.

7. The exhaust gas system of claim 5, wherein the particulate trap is housed in an underfloor position, downstream of the sulfur trap.

8. The exhaust gas system of claim 7, wherein the particulate trap is housed in an underfloor position, upstream of the $NO_x$ adsorber.

* * * * *